Aug. 25, 1970      A. R. NORDEN      3,525,835
ELECTRIC SWITCHGEAR
Filed June 8, 1965      8 Sheets-Sheet 1

WITNESSES
Bernard R. Giguere
James F. Young

INVENTOR
Alexander R. Norden
BY
William A. Elchik
ATTORNEY

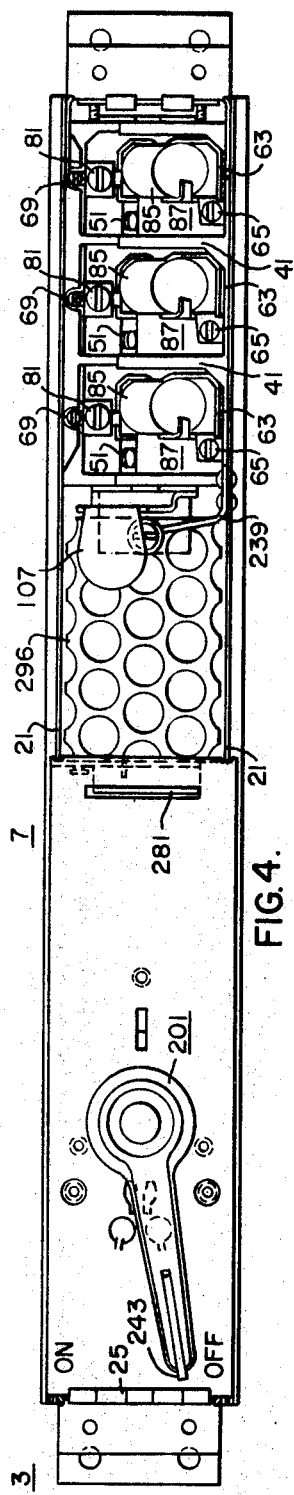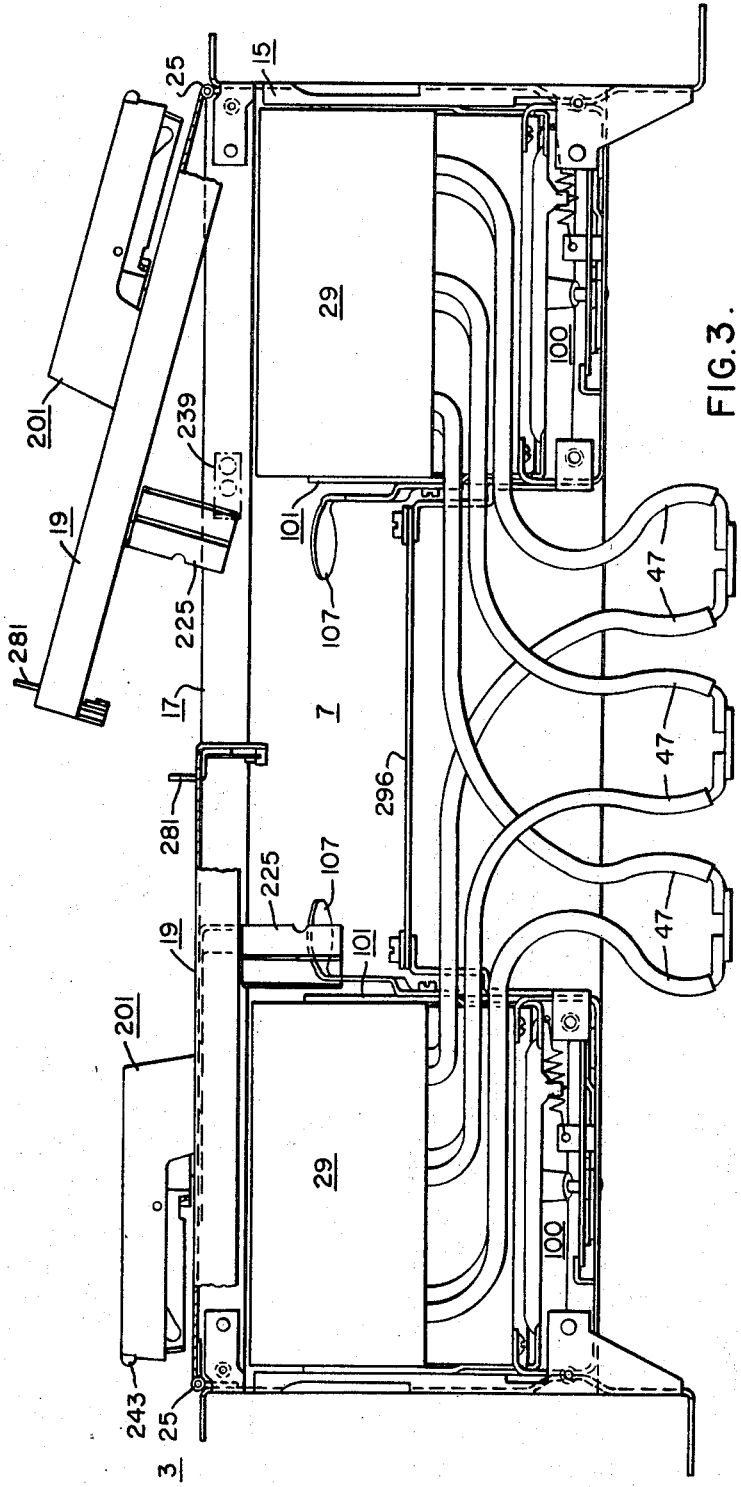

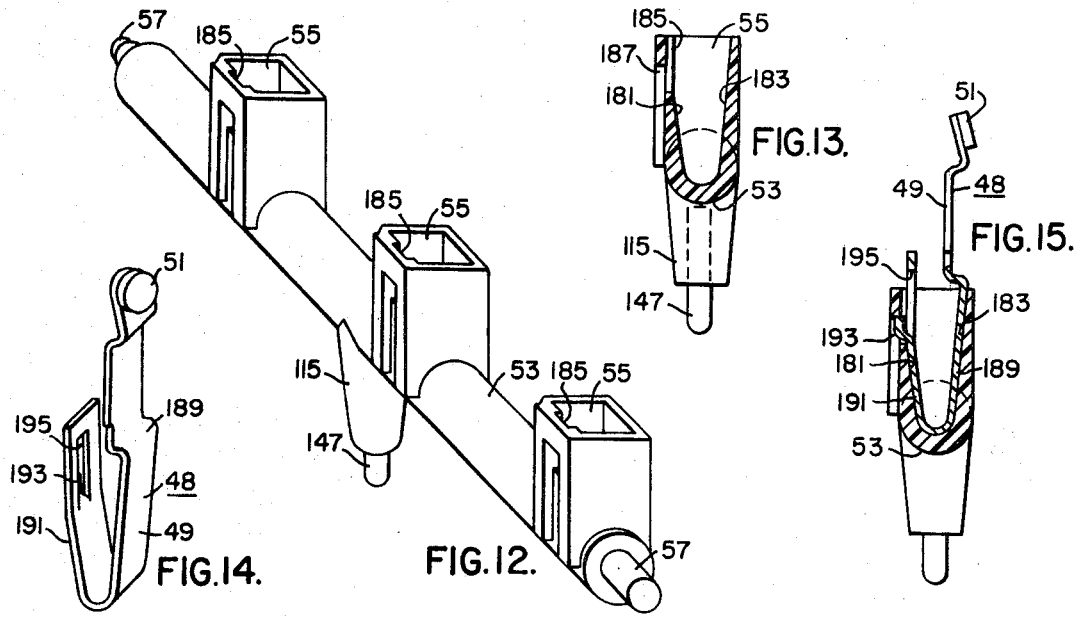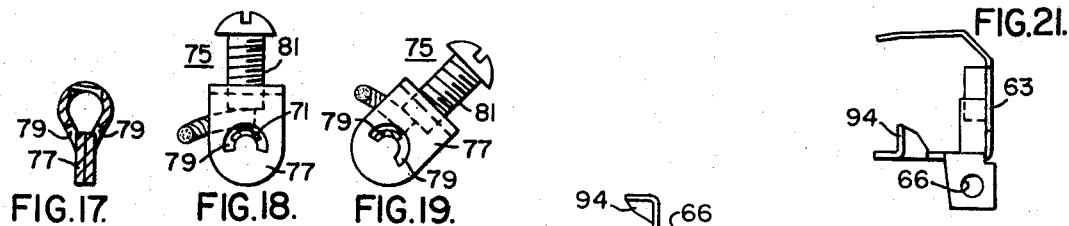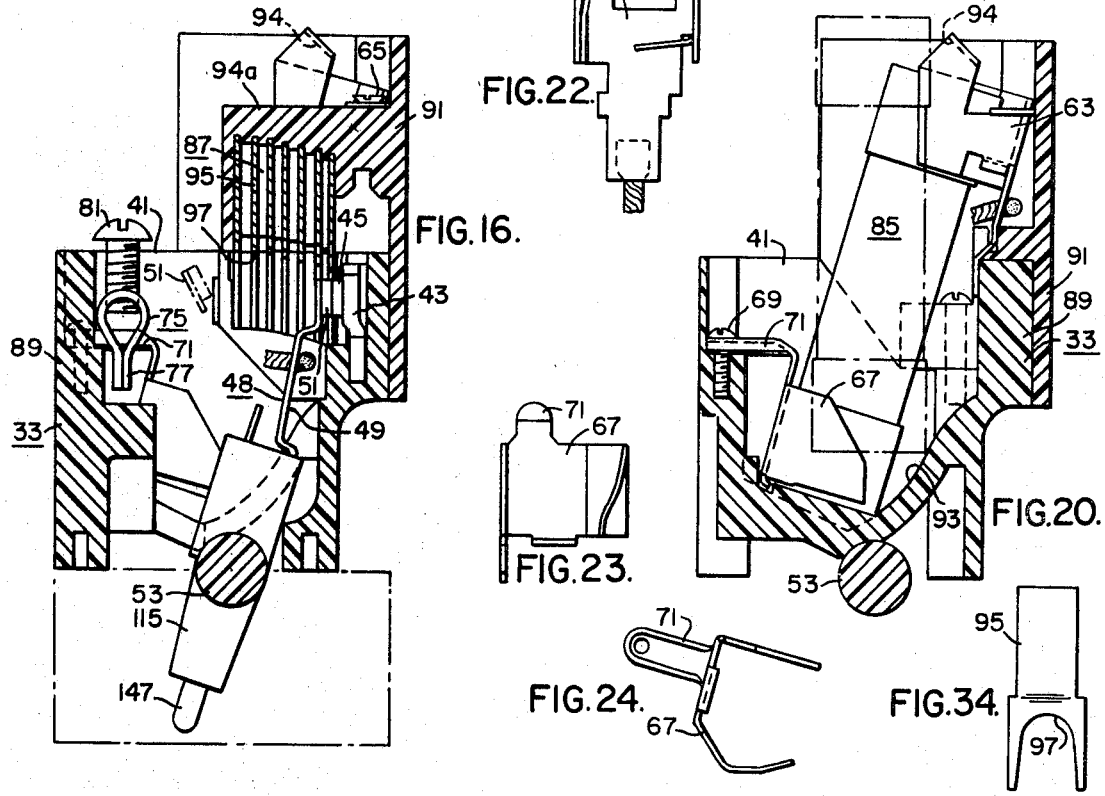

Aug. 25, 1970  A. R. NORDEN  3,525,835
ELECTRIC SWITCHGEAR
Filed June 8, 1965  8 Sheets-Sheet 6

Aug. 25, 1970   A. R. NORDEN   3,525,835
ELECTRIC SWITCHGEAR
Filed June 8, 1965   8 Sheets-Sheet 8
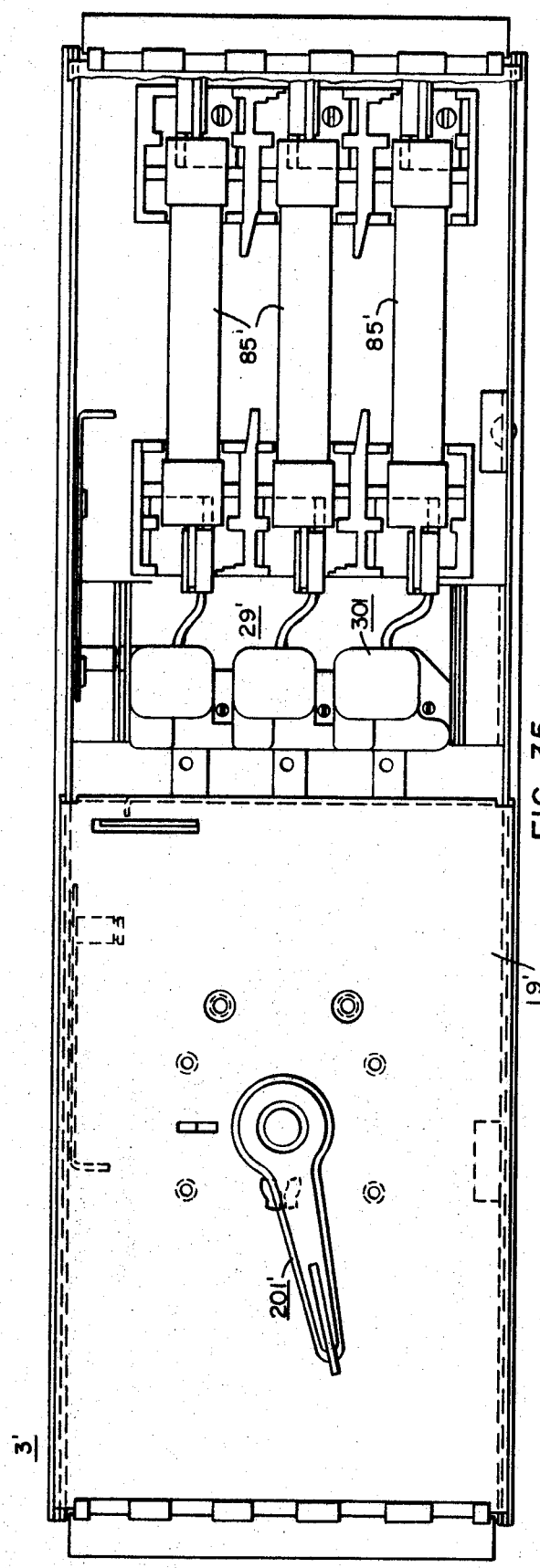
FIG. 35.
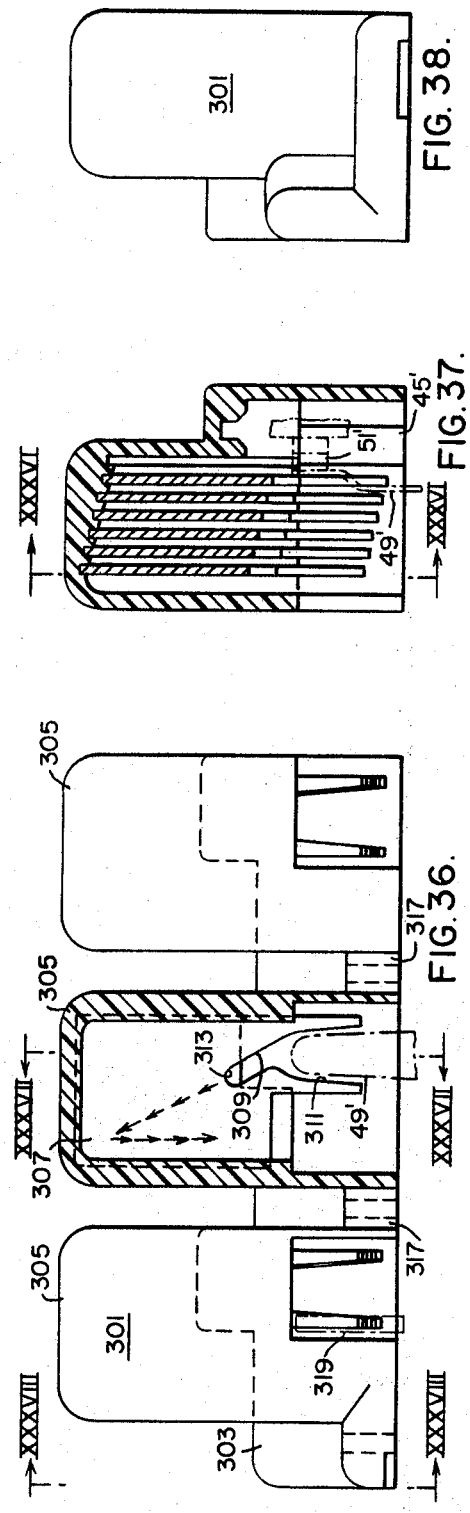
FIG. 38.
FIG. 37.
FIG. 36.

United States Patent Office 3,525,835
Patented Aug. 25, 1970

3,525,835
ELECTRIC SWITCHGEAR
Alexander R. Norden, New York, N.Y., assignor to Westinghouse Electric Corporation, Pittsburgh, Pa., a corporation of Pennsylvania
Filed June 8, 1965, Ser. No. 462,361
Int. Cl. H01h 3/00
U.S. Cl. 200—153         5 Claims

ABSTRACT OF THE DISCLOSURE

An improved switch device comprises an enclosure and a compactly constructed switch structure supported within the enclosure. The switch structure is constructed and arranged such that the position of the contacts can be readily determined by visual inspection from the front of the enclosure when the enclosure cover is in the open position.

---

A general object of this invention is to provide an improved, compactly constructed circuit controlling device.

Another object of this invention is to provide a switch structure comprising an improved operating mechanism.

Another object of this invention is to provide an improved switch so constructed that the position of the contacts can be readily determined by visual inspection from the front of the switch.

The novel features that are considered characteristic of the invention are set forth in particular in the appended claims. The invention itself, however, both as to structure and operation, together with additional objects and advantages thereof, will be best understood from the following detailed description when read in conjunction with the accompanying drawings.

In said drawings:

FIG. 3 is a view similar to FIG. 2 with one of the enclosure side walls removed and with one of the cover structures being shown in the partly open position;

FIG. 4 is a top plan view of the enclosed switch structure seen in FIG. 3 with both side walls in place and with one of the covers removed;

FIG. 12 is a perspective view of the tie bar seen, for example, in FIGS. 5, 10 and 11;

FIG. 13 is a sectional view through one of the three contact-arm cavities of the tie bar seen in FIG. 12;

FIG. 14 is a perspective view of one of the contact-arm structures of one of the switches;

FIG. 15 is a view similar to FIG. 13 with the contact-arm structure of FIG. 14 in place;

FIG. 16 is a sectional view, with parts broken away, through one of the pole units of one of the switches;

FIG. 17 is a sectional view of one of the parts of the connecting structure disclosed in FIG. 18;

FIG. 18 is a sectional view of one of the connecting structures, which view is taken generally along the line XVIII—XVIII of FIG. 33;

FIG. 19 is a view similar to FIG. 18, with part of the connecting structure being rotated to a different position;

FIG. 20 is a sectional view illustrating one of the fuse-compartments of one of the switches;

FIG. 21 is a top plan view of the upper fuse clip seen in FIG. 20;

FIG. 22 is an end view of the fuse clip seen in FIG. 21 with part of a flexible conductor secured to the fuse clip;

FIG. 23 is an end view of the bottom fuse clip seen in FIG. 20;

FIG. 24 is a bottom plan view of the bottom fuse clip seen in FIG. 23;

FIG. 34 is a top plan view of one of the arc plates seen in FIG. 16;

FIG. 35 is a plan view, with one of the covers removed, of the largest of the three enclosed switch structures seen in FIG. 1;

FIG. 36 is an elevational view of the arc-extinguishing structure seen in FIG. 35 with the center pole unit being shown in section along the line XXXVI—XXXVI of FIG. 37;

FIG. 37 is a sectional view taken generally along the line XXXVII—XXXVII of FIG. 36; and FIG. 38 is a view taken along the line XXXVIII—XXXVIII of FIG. 36.

Figure 1:
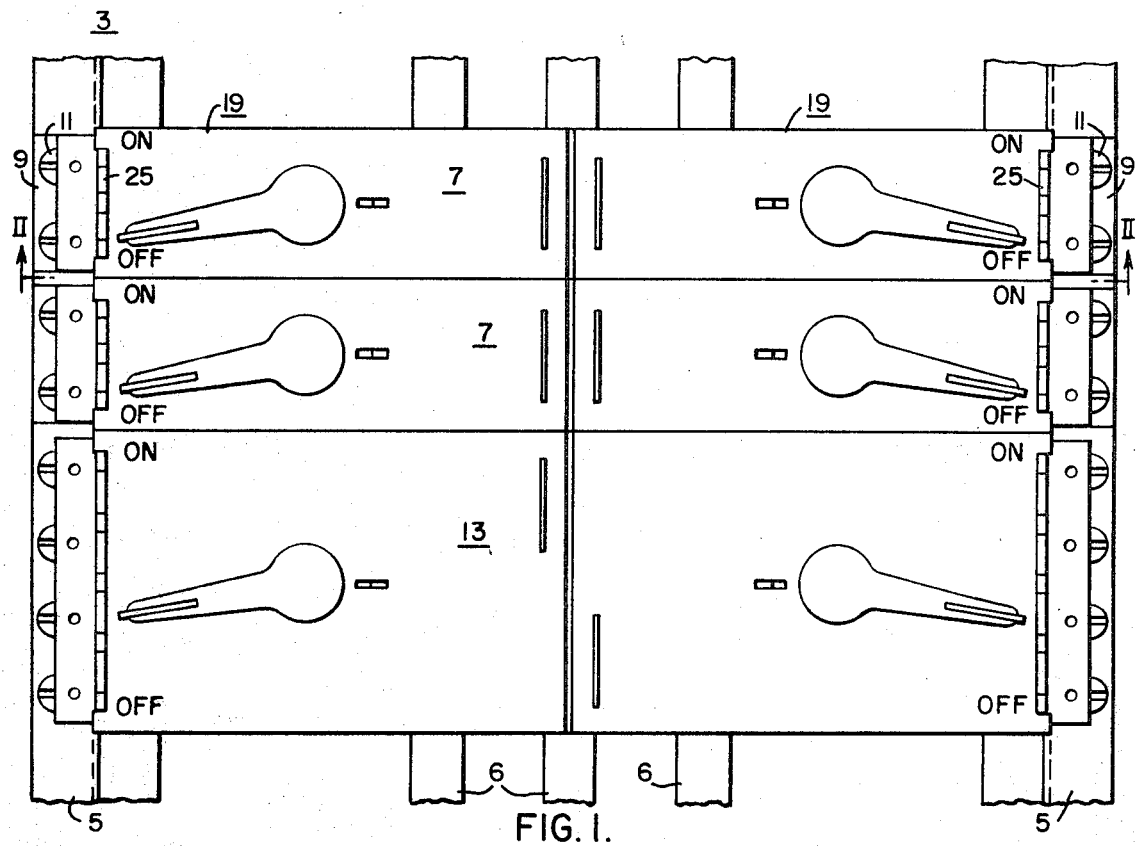
FIG. 1 is an elevational view of part of a switchboard 3 embodying principles of this invention.
Figure 2:
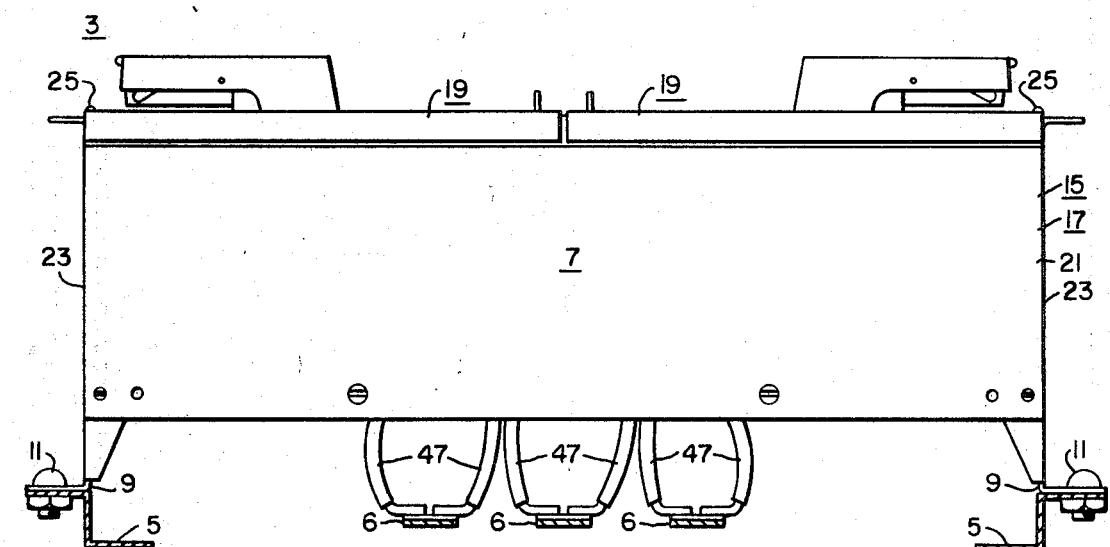
FIG. 2 is a sectional view taken generally along the line II—II of FIG. 1.

Referring to the drawings, there is shown, in FIGS. 1 and 2, part of a switchboard or panelboard 3 comprising a pair of elongated rigid metallic support members 5 suitably supported in a spaced parallel relationship. Three elongated bus bars 6 are suitably supported in a parallel relationship in the switchboard 3 between the support members 5. Two enclosed switch structures or switch devices 7 of a first size and rating are supported on the support members 5 by means of spaced feet 9 that are secured to the members 5 with securing means 11. An enclosed switch structure 13 of a larger size and higher rating is supported on the support member 5. Only one of the enclosed switch structures 7 of the smaller size and lower rating will be hereinafter specifically described.

The enclosed switch structure 7 comprises an enclosure 15 (FIG. 2) which comprises a receptacle part 17 and a cover structure 19. The receptacle part 17 comprises two side walls 21 (only one side wall being shown in FIG. 2) and two end walls 23 which cooperate with the side walls 21 to form a structure that is generally tubular in that it is open at the front and back. Each of the cover structures 19 is pivotally supported on the receptacle part 17 at a different one of the two opposite ends of the receptacle part 17 by means of hinge means 25. The cover structure 19 on the right (FIG. 3) is supported to open in a generally clockwise direction and the cover structure 19 on the left is supported to open in a counterclockwise direction. Each of the two cover structures 19 (FIG. 3) is supported over a different one of two separate fused switch structures 29. The fused switch structures 29 are suitably mounted between the side walls of the enclosure. Only one of the fused switch structures 29 will be specifically described. It is to be understood that, unless otherwise set forth, the description applies to both of the fused switch structures 29.

Figure 5:
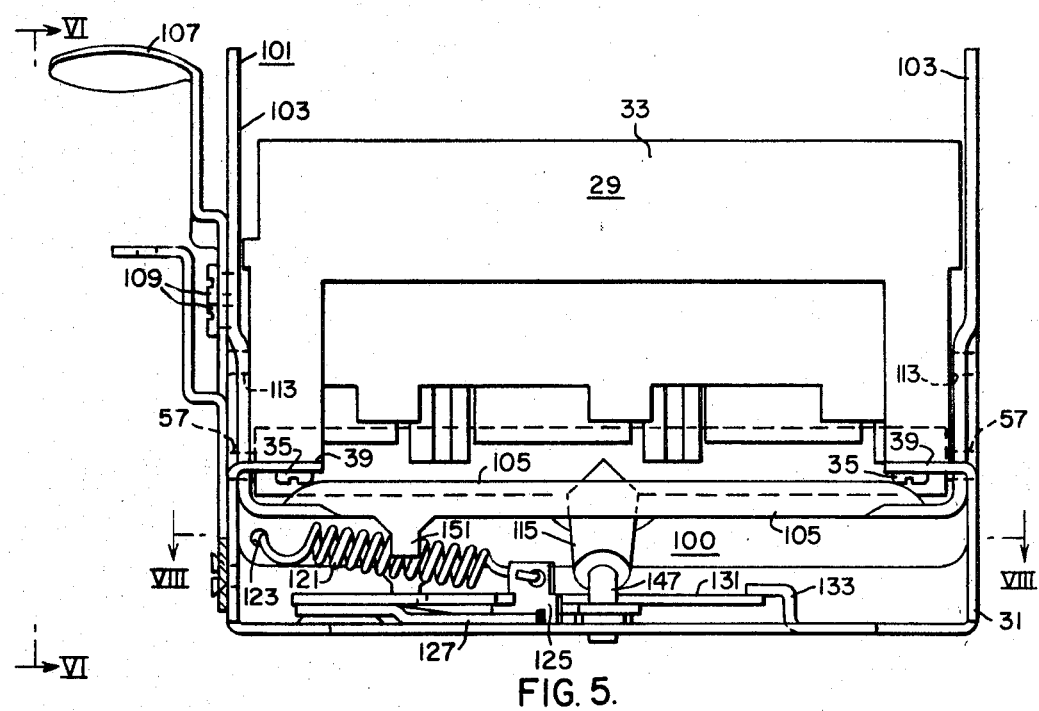
FIG. 5 is a side view, partly in section, of the mechanism of one of the switches of the switch structure disclosed in FIGS. 1–4.

Referring to FIG. 5, the fused switch structure 29 shown therein comprises a generally U-shaped metallic rigid supporting plate 31. An insulating housing structure 33 is fixedly mounted on the supporting plate 31 by means of four screws 35 that pass through four openings 37 (FIGS. 8 and 9) in four bent-over parts 39 of the support plate 31.

The housing structure 33 comprises a molded insulating housing structure having three compartment sections for the three pole units of the switch. As can be seen in FIGS. 4, 16 and 20, the adjacent compartment sections are separated by insulating barrier means 41.

Figure 33:
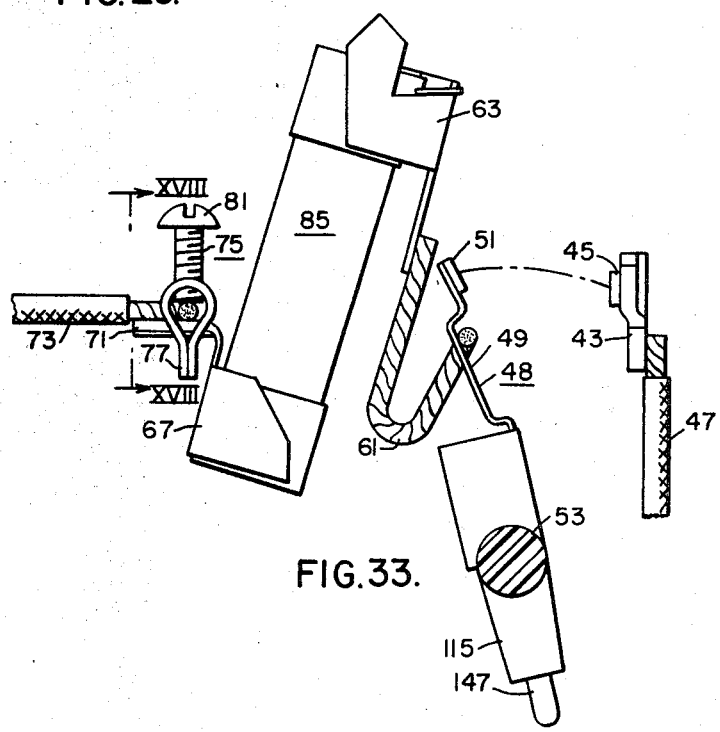
FIG. 33 is a schematic view illustrating the electrical circuit through one of the pole units of one of the switches of this invention.

Referring to FIGS. 16, 20 and 33, each of the pole units of the three-pole fused switch structure 29 comprises a stationary conductor 43 having a stationary contact 45 secured thereto. The stationary conductor 43 is a generally rigid conductor that is fixedly secured in a suitable slot in the insulating housing structure 33. An insulated flexible line conducting wire 47 is fixedly secured at one uninsulated end thereof to the stationary conductor 43 and at the other uninsulated end thereof to a tie plate that is connected to one of the bus bars 6 (FIG. 2).

In each pole unit, there is a separate contact arm structure 48. Each contact arm structure 48 comprises a contact arm 49 and a contact 51 that is secured to one end of the contact arm 49. Each of the contact arm structures 48 is secured to an insulating contact support or tie bar 53 in a separate cavity 55 (FIG. 12) in a manner to be hereinafter specifically described. The tie bar 53 is provided with pin-portions 57 that are molded integral with the tie bar at the opposite ends of the tie bar. The pin portions 57 fit in openings in the opposite arms of the U-shaped supporting plate 31 (FIG. 5) to rotatably support the tie bar 53 on the supporting plate 31. In each pole unit, a flexible conductor 61 (FIG. 33) is welded or otherwise suitably secured at one end thereof to the associated conducting contact arm 49 and at the other end thereof to an upper conducting fuse clip 63. In each pole unit, the upper fuse clip 63 is fixedly secured in the associated cavity by means of a screw 65 (FIGS. 4 and 16) that passes through an opening 66 (FIGS. 21 and 22) in a bent-over portion of the fuse clip and is threaded into a tapped opening in the insulating housing structure 33. In each pole unit, a lower conducting fuse clip 67 (FIGS. 20, 23, 24 and 33) is secured to the insulating housing structure 33 by means of a separate screw 69 (FIGS. 4 and 20). Each of the lower fuse clips 67 comprises a bent-over connecting part 71. A separate load conductor 73 (FIG. 33) is connected to each of the fuse clip connecting parts 71 by means of a solderless terminal connecting structure 75 that comprises a lower part 77 (FIGS. 17–19) having opening means 79 therein which opening means is annular to receive the connecting part 71 that is annular in cross section and which opening means is elongated enough to permit a swiveling movement of the part 77 on the stationary fuse clip connecting part 71. As can be seen in FIG. 19, the member 77 can be swiveled from the FIG. 18 position in a generally clockwise direction to the FIG. 19 position which movement is limited by the engagement of the stationary part 71 with the end of the opening means or slot 79. The member 77 could also be swiveled from the FIG. 18 position in the opposite (counterclockwise) direction which movement would be limited by the engagement of the stationary part 71 with the opposite end of the slot 79. The member 77 is provided with a tapped opening at the top thereof to receive a connecting screw 81 that is threaded into the member 77 to effect a pressure connection between the fuse clip connecting part 71 (FIG. 33) and the uninsulated end of the flexible load conductor 73. The connecting structure 75 can be moved on the part 71 to the position wherein it can most readily receive an incoming wire that may be brought into the connecting structure from either of the two opposite sides of the connecting structure.

In each of the fused switch structures 29, the circuit through each of the three pole units extends from one of the bus bars 6 (FIG. 3) through the flexible conductor 47, the stationary conductor 43 (FIG. 33), the contacts 45–51, the movable contact arm 49, the flexible conductor 61, the upper fuse clip 63, a fuse 85, the lower fuse clip 67, the connecting part 71, to the flexible load conductor 73 that is secured to the connecting part 71 by means of the swivel-type solderness terminal connector 75. The contacts 45, 51 are opened when the common tie bar 53 is rotated from the FIG. 16 position to the FIG. 33 position during which movement an arc is generated between the contacts which arc is extinguished in an arc-extinguishing structure 87.

The insulating housing structure 33 (FIGS. 16 and 20) comprises a bottom part 89 and a top part 91 both of insulating material which parts 89 and 91 are suitably fastened together. As can be seen in FIG. 20, the three upper fuse clips 63 are secured to the top part 91 and the three lower fuse clips 67 are secured to the lower part 89. Each of the fuses is mounted in place by being dropped into the associated cavity in the insulating housing structure 33 whereupon the bottom part of the fuse engages a lower cam surface 93 (FIG. 20) in the associated compartment. The fuse 85 is shown in this initial position in dot-dash lines in FIG. 20. Thereafter, when a manual force is applied to the top part of the fuse 85 forcing the fuse downward and forcing the top part of the fuse to the right (FIG. 20) the bottom part of the fuse will be cammed along the cam surface 93 into the lower fuse clip 67 and the top part of the fuse will be forced into the upper fuse clip 63. The fuse 85 is shown in the mounted position by means of full lines in FIG. 20. An upper cam surface 94 (FIGS. 20–22) may also be provided to aid in positioning the fuse 85 during mounting operations and to serve as a fuse stop to limit axial movement of the fuse 85.

The top part 91 of the insulating housing structure 33 comprises three arc-hood devices or arc-extinguishing structures 87 (FIG. 16) for the three pole units of the three-pole fused switch structure 29. Each of the arc-extinguishing structures 87 comprises an insulating housing part 94a that is molded integral with the top part 91 of the housing structure 33. The insulating housing part 94a comprises a top or back and four side walls extending downward from the back forming a pocket or cavity that is closed at the back and four sides and open at the lower end. A plurality of flat planar magnetic steel plates is mounted in a spaced parallel face-to-face relationship in suitable slots in the cavity. Each of the plates 95 is formed with a slot 97 (FIGS. 16 and 34) therein. The slots 97 are aligned to receive the movable contact 51 and permit movement of the movable contact 51 from the full line position to the dot-dash line position seen in FIG. 16. During opening operations an arc is drawn between the opening contacts and the magnetic lines of force that are generated around the arc operate through the magnetic steel plates 95 to draw the arc into the plates, whereupon the arc is broken into a plurality of serially related arcs that are extinguished.

The switch contacts are manually operated to the opened and closed positions by operation of an operating mechanism indicated generally at 100 in FIG. 5. The operating mechanism comprises a generally U-shaped operating lever 101 comprising two opposite legs 103 and a bight portion 105 connecting the legs 103. An operating arm 107 (FIG. 5) is fixedly secured to the left (FIG. 5) leg 103 by means of screws 109. The operating arm 107 could also be secured to the right (FIG. 5) leg 103 to permit operation of the fused switch 29 from the other end of the fused switch 29. The U-shaped operating lever 101 is pivotally supported on the U-shaped supporting plate 31 between the opposite legs of the plate 31 by means of two pivot pin parts 113 that are formed in the opposite legs of the operating lever by means of a stamping operation. The pivot pin parts 113 are positioned for rotatable movement in openings 114 (FIG. 7) in the opposite legs of the U-shaped supporting plate 31. The tie bar 53, which is operated by operation of the U-shaped operating lever 101, is provided with a lower extension 115 that passes through a suitable opening 117 (FIGS. 10 and 11) in the bight portion of the operating lever 101 during operation of the switch. The pin portions 57 at the opposite ends of the tie bar 53 pass through two openings 119 in the two opposite legs of the U-shaped operating lever 101 and they are positioned and supported for rotatable movement in suitable openings in the opposite legs of the U-shaped supporting plate 31 to thereby rotatably support the tie bar on the supporting plate 31.

A spring 121 (FIGS. 5, 8 and 9) is supported at one end thereof in an opening 123 in the bight portion of the U-shaped operating lever 101 and at the other end in a suitable opening in the bent-over part 125 of a lever 127. The lever 127 is a generally flat member that is disposed and moves generally in a plane parallel to the plane of the generally planar bight portion of the supporting plate 31, and the bent-over part 125 extends upwardly (FIG. 5) in a direction generally normal to the plane of the main part of the lever 127. The lever 127 is supported for movement on the supporting plate 31 about a fixed pivot 129 (FIGS. 8 and 9). Another lever 131 is supported for pivotal movement on the plate 31 about the same fixed pivot 129. The lever 131 is also a generally flat planar member that moves along a plane generally parallel to the planar bight portion of the supporting plate 31, and the free end of the lever 131 is held in position by means of a bent-over part 133 of the supporting plate 31 which bent-over part 133 (FIGS. 5, 8 and 9) serves to limit movement of the free end of the lever 131 in the direction away from the bight portion of the supporting plate 31. The levers 127 and 131 are operated to operate a toggle comprising a toggle link 137 and a toggle link 139. The toggle link 137 is a flat planar member that is supported for movement along a plane generally parallel to the plane of the planar bight portion of the supporting plate 31. The toggle link 137 is supported on the plate 31 for movement about a fixed pivot 141. The toggle link 137 is operatively connected to the toggle link 139 by means of a knee pivot pin 143. The toggle link 139 is also a flat planar member that moves along a plane generally parallel to the plane of the bight portion of the supporting plate 31. The knee pivot 143 of the toggle 137, 139, moves in a slot 145 in the lever 131. The part 115 of the tie bar 53 (FIGS. 10–12) supports a pin 147 that is positioned in an opening 149 (FIG. 10) in the lower toggle link 139 to operatively connect the tie bar 53 with the lower toggle link 139. As is best seen in FIGS. 5–7, 10 and 11, the U-shaped operating lever 101 is provided with two projections 151 and 153 formed integral with the bight portion of the member 101 on opposite sides of the bight portion.

Figure 6:
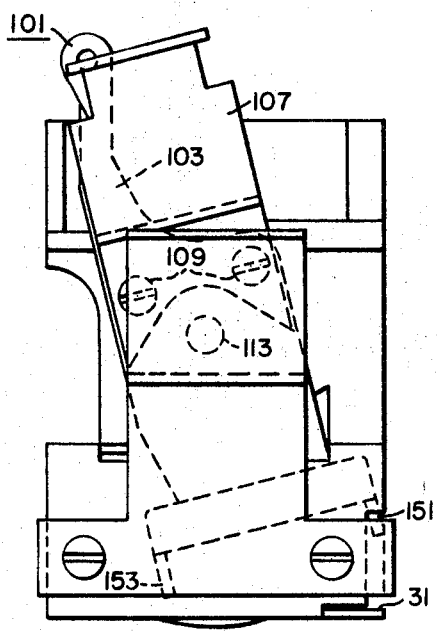
FIG. 6 is a view taken generally along the line VI—VI of FIG. 5.
Figure 7:
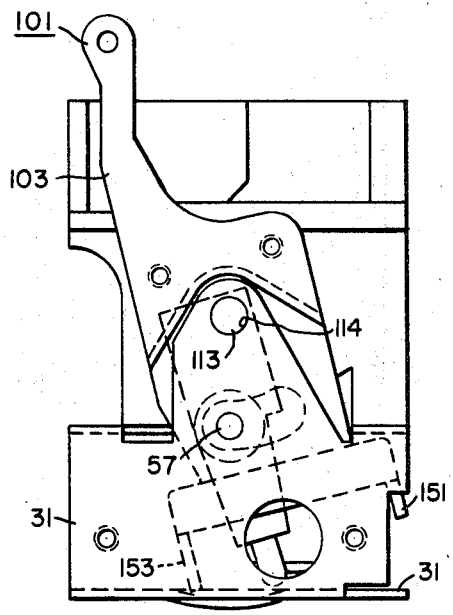
FIG. 7 is a view similar to FIG. 6 with certain parts removed for the purpose of clarity.
Figure 8:
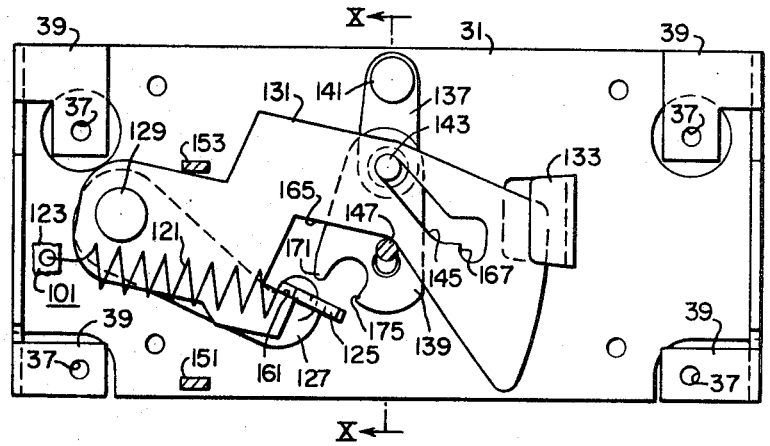
FIG. 8 is a sectional view taken generally along the lnie VIII—VIII of FIG. 5.
Figure 9:
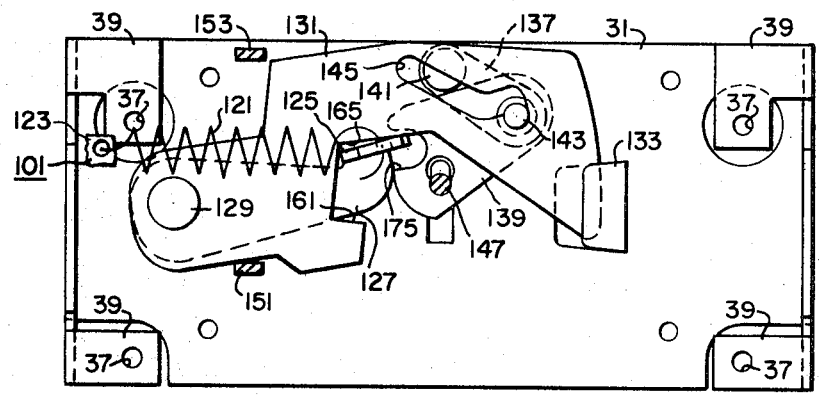
FIG. 9 is a view similar to FIG. 8 with the parts being shown in the "open" position.
Figure 10:
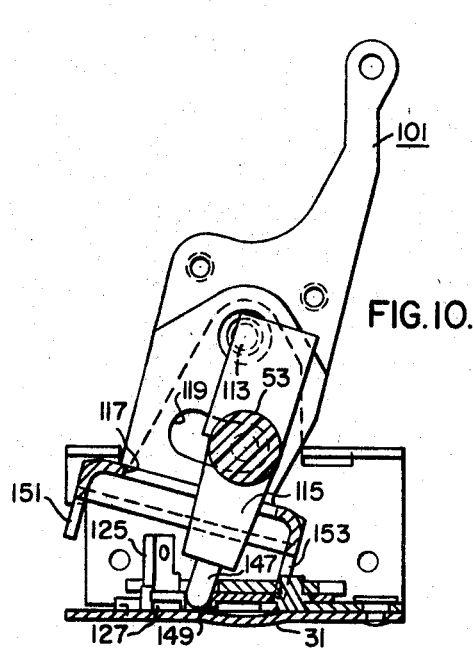
FIG. 10 is a sectional view of part of one of the switches which view is taken through the switch at a position indicated by the line X—X in FIG. 8.
Figure 11:
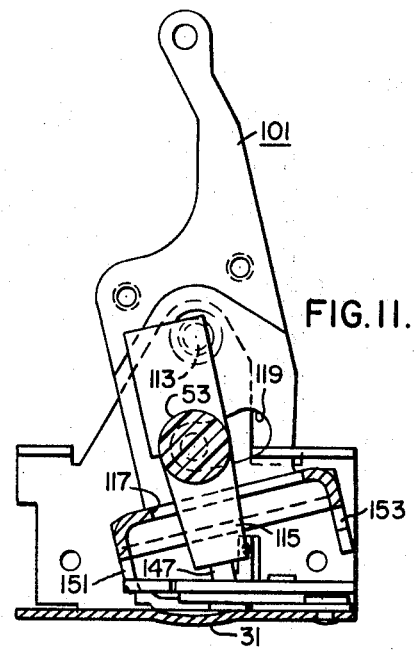
FIG. 11 is a view similar to FIG. 10 with the parts being shown in the "open" position.

The operation of the fused switch structure 29 will be best understood with reference to FIGS. 5–11. It is noted that FIGS. 6 and 7 are views looking to the right in FIG. 5, and FIGS. 10 and 11 are sectional views looking to the left in FIG. 8. Because of the opposite directions from which these figures are viewed, it is to be understood that a description of direction of motion of parts will be reversed as one's reference is moved from one to the other of these pairs of figures. For example, clockwise movement of the operating member 101 as seen in FIGS. 6 and 7 is counterclockwise movement as seen in FIGS. 10 and 11.

The switch structure is shown in the closed position in FIGS. 5–8, 10 and 16. In this position, the tie bar 53 (FIG. 16) is positioned such that the three movable contacts 51 are in engagement with the three stationary contacts 45. The switch structure 29 is opened by clockwise (FIGS. 6 and 7) movement of the operating lever 101 about the pivots 113. During this movement, the projection 151 on the bight portion 105 of the operating lever 101 engages the member 131, pivoting the member 131 in a counterclockwise (FIG. 8) direction about the pivot 129. During this movement, a part 161 (FIGS. 8 and 9) of the member 131 engages the bent-over spring support part 125 of the member 127 moving the member 127 in a counterclockwise (FIG. 8) direction about the pivot 129. During this movement, therefore, both ends of the spring 121 are moved toward the open position and, when the line of action of the spring 121 moves over a line between the center of the pivot 129 and the spring support at the spring support part 125 of the member 127, the charged tension spring 121 will operate to move the member 127 about the pivot 129 in a counterclockwise (FIG. 8) direction to the open position with a snap action. During this movement, the member 127 moves ahead of the slower moving member 131 and the bent-over spring support 125 of the member 127 engages a part 165 of the member 131 to move the member 131 with a snap action to the fully open position seen in FIG. 9. As the member 131 is moved from the closed (FIG. 8) to the open (FIG. 9) position, the slot 145 therein is moved to cam the knee pivot 143 of the toggle 137, 139 from the closed position seen in FIG. 8 to the open position seen in FIG. 9. This movement of the lower toggle link 139 operates through pin 147 of the tie bar 53 (FIGS. 10 and 11) to rotate the tie bar 53 counterclockwise (FIG. 16) from the closed to the open position to simultaneously move the contacts 51 of the three pole units to the open position seen in dot-dash lines FIG. 16. As is best seen in FIG. 8, the slot 145 is provided with a hook-part 167 at one end thereof. Near the end of the opening operation, the member 131 moves to position the knee pivot 143 in the lower end of the hookpart 167, and the knee pivot 143 will engage the edge of the lower end of the hook-part 167 to prevent movement of the knee pivot 143 toward the closed position thereby preventing bounce-back of the contact supporting tie bar 53 when the tie bar reaches the open position.

As will be hereinafter described, the operating lever 101 is operated by means of an external operating handle. It is desirable to provide against having the external operating handle indicate that the contacts are closed when the contacts are in fact open. If for any reason the toggle 137, 139 is prevented from moving to the open position, the bent-over spring support part 125 of the member 127 will engage a projection 171 (FIG. 8) on the lower toggle link 139 to prevent movement of the spring 121 to an over-center position so that the force of the spring 121 will move the operating lever 101 and the external operating handle back to the open position after the operator has released the external operating handle.

When it is desired to operate the fused switch structure 29 from the "open" to the "closed" position, the operating member 101 is moved from the position seen in FIG. 11 to the position seen in FIG. 10. During this movement, the projection 153 on the bight portion 105 of the operating lever 101 engages the member 131 moving the member 131 in a clockwise (FIG. 9) direction about the pivot 129 and during the initial part of this movement, the slot 145, 167 moves relative to the knee pivot 143 to release the interlock that prevented bounce-back movement of the knee pivot 143 during the opening operation. During the initial part of this clockwise movement of the member 131, the part 165 of the member 131 engages the bent-over spring support part 125 of the member 127 to pivot the member 127 in a clockwise (FIG. 9) direction about the pivot 129. During this movement, both ends of the spring 121 are moved and the knee pin 143 is cammed in the slot 145 to start to straighten the toggle 137, 139. When the line of action of the spring 121 moves over a line between the center of the pivot 129 and the spring support at the spring support part 125 of the member 127, the charged tension spring 121 will operate to move the member 127 in a clockwise (FIG. 9) direction about the pivot 129 to the fully closed position (FIG. 8) with a snap-action. During the initial part of this snap-action movement of the member 127, the bent-over part 125 moving under the force of the spring 121 will engage a part 175 of the lower toggle link 139 moving the toggle link 139 (and the parts connected thereto) toward the closed position. Near the end of this closing movement of the member 127, the part 125 of the member 127 will leave the slot formed by the parts 171, 175 of the lower toggle 139 and leap forward under the force of the spring 121 to engage the part 161 of the member 131 to thereby move the member 131 to the fully closed position seen in FIG. 8 during which movement the slot portion 145 of the member 131 cams the knee pivot pin 143 and, therefore, the toggle 137, 139 to the fully closed position with a snap-action. This closing movement of the toggle 137, 139 operates through the pin 147 to rotate the tie bar 53 in a clockwise (FIG. 16) direction to the closed (FIG. 16) position moving the three movable contacts 51 into engagement with the three stationary contacts 45. The toggle 137, 139 is stopped in a position either on or over dead center to thereby prevent movement of the toggle toward the open position by the force of opening movement of the tie bar pin 147. Thus, the erected (FIG. 8) toggle will prevent bounce-back movement of the contact supporting tie bar 53 during closing operations. The erected toggle will also prevent movement of the tie bar 53 toward the open position by electrodynamic forces on the contact structures during a short circuit.

If for some reason the contact arms 49, tie bar 53 (FIG. 16) or toggle 137, 139 are prevented from moving to the closed position during an attempted closing operation of the switch, the bent-over spring part 125 (FIG. 9) of the member 127 will engage the part 175 of the toggle link 139 limiting movement of the spring support part 125 to thereby prevent movement of the spring 121 to an over-center position. Thus, when the operator releases the external handle, the spring 121 will operate to move the operating lever 101 and external handle back to the open position so that the external handle will truly indicate that the switch mechanism and parts are in the open position.

It is to be noted that the three movable contacts 51 are visible in the front elevational view (FIG. 4) of the open fused switch structure 29. As can be seen in FIGS. 4 and 16, when the fused switch structure 29 is operated to the open position the three movable contacts 51 leave the arc-extinguishing structure 87 to come to rest at a position wherein they are clearly visible to a worker looking into the enclosure from the front of the enclosure so that the worker can readily determine the position of the switch contacts by visual inspection.

The tie bar 53 (FIGS. 12, 13 and 15 comprises a rigid member of insulating material that is molded in a form providing three spaced pockets or cavities 55. Each of the cavities 55 comprises opposite side walls 181 and 183. Each of the side walls 181 is provided with a slot portion 185 (FIG. 12), and an opening 187 (FIG. 13) is provided in each of the side walls 181 at the slot portion 185 of the side wall. The contact arm 49 (FIG. 14) comprises a generally J-shaped member of resilient conducting material. The J-shaped contact arm 49 comprises a long arm 189 (FIG. 14) having the contact 51 secured thereto at the outer end thereof, and a short arm 191 having a tang 193 formed thereon leaving an opening 195 in the short arm 191. When it is desired to mount one of the contact arms 49 in position on the tie bar 53, the contact arm is positioned over one of the cavities 55 and the short arm 191 thereof is positoned with the tank 193 thereof aligned with the slot 185. The contact arm 49 is then pushed down to the fully mounted position during which movement the arms 189, 191 are initially spring charged toward each other and near the end of this mounting operation the tang 193 snaps into the opening 187 and engages a ledge formed at the opening to maintain the contact 49 in the mounted position seen in FIG. 15. The side walls 181, 183 of the associated cavity are spaced, relative to the spacing of the arms 191, 189 of the contact 49, such that the arms 191, 189 of the contact 49 will resiliently engage the opposite side walls 181, 183 providing a firm mounting arrangement. The position of the movable contact 51 and tang 193 of the contact structure 49 is such that in the closed position, as contact pressure is effected between the contacts, 51, 45, the force of this contact pressure will tend to maintain the tank 193 in the securing position seen in FIG. 15. When it is desired to remove the contact structure 48, the opposite arms 191, 189 thereof are merely pressed together moving the tang 193 out from the opening 187, and the contact structure 48 is merely lifted out of the cavity 55. If it is inconvenient to press both of the contact arms 191, 189 together, a tool may be placed in position to merely press the short leg 191 toward the long leg 189 moving the tang 193 to an unlocking position, and the contact structure 48 is then moved out of the associated cavity 55.

Figure 25:
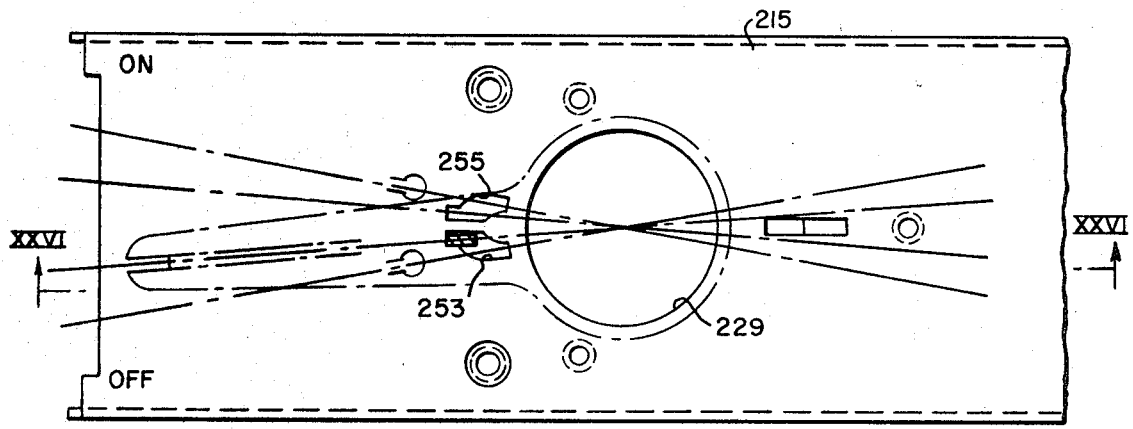
FIG. 25 is a sectional view taken generally along the line XXV—XXV of FIG. 26 with certain parts of the handle structure removed for the purpose of clarity and with part of the handle structure shown in dot-and-dash lines.
Figure 26:
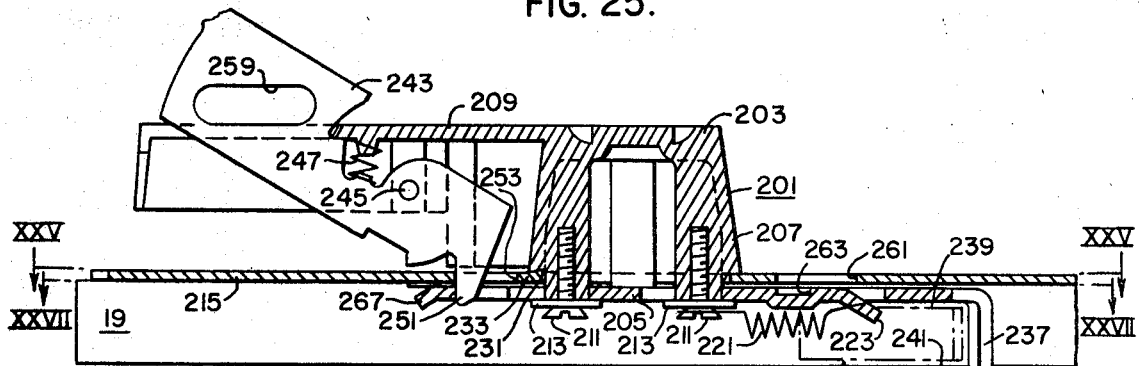
FIG. 26 is a sectional view taken generally along the line XXVI—XXVI of FIG. 25 with part of the switch mechanism and enclosure being shown in dot-and-dash lines.
Figure 27:
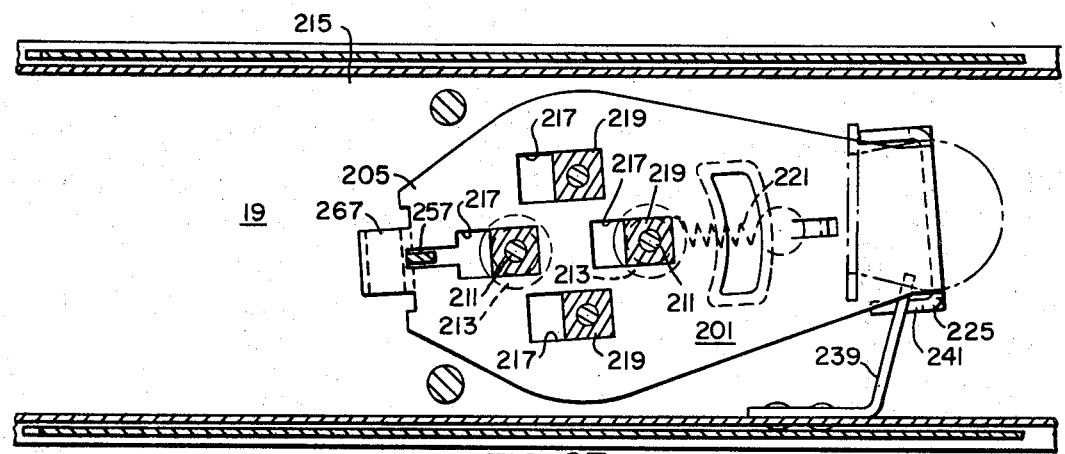
FIG. 27 is a sectional view taken generally along the line XXVII—XXVII of FIG. 26.

As can be seen in FIG. 3, the operating arm 107 can be fixedly secured to either of the two legs of the U-shaped operating member lever 101 so that the fused switch 29 can be operated from either side thereof. The operating arm 107 is operated to move the operating lever 101 between the open and closed positions by operating of a handle structure 201 (FIGS. 26 and 27). The handle structure 201 comprises an outer handle part 203 and and an inner connecting part 205. The outer handle part 203 comprises a hub portion 207 and a handle portion 209. The inner connecting part 205 is secured to the outer part 203 by means of two screws 211 and two washers 213. The inner part 205 is captured between the washers 213 and the inside of a front cover part 215. The connection between the parts 205 and 203 is a slidable connection in that four elongated slots 217 (FIG. 27) in the inner part 205 receive four parts 219 of the outer part 203 permitting the inner part 205 to slide rectilinearly while captured between the washers 213 and the cover 215. A spring 221 is supported under tension between one of the screws 211 on the part 203 and a projection 223 on the part 205 to bias the part 205 to the left as seen in FIGS. 26 and 27. The part 205 is provided with a lower connecting part 225 having opposite leg portions that straddle the member 107 when the cover structure 19 (FIG. 3) is in the closed position. As is seen in FIG. 3, when the cover structure 19 is lifted toward the open position, the opposite legs of the member 225 permit the connecting part 225 to move away from the member 107. As is seen in FIG. 25, a circular opening 229 in the planar cover part 215 receives a circular hub part 231 (FIG. 26) of the handle part 203, and a flange portion 233 of the handle part 203 engages the front of the cover 215 whereby the handle structure 201 comprising the handle part 203 and the connecting part 205 is rotatably supported on the cover part 215.

The operating handle structure 201 is rotated about the hub portion 231 thereof between the "on" and "off" positions (FIGS. 1 and 4) to rotate the operating arm 107 and therefore the operating lever 101 back-and-forth between the closed (FIG. 10) and open (FIG. 11) positions to close and open the switch contacts in the manner hereinbefore described. The connecting part 225 (FIG. 26) of the inner part of the handle structure 201 is formed with an opening at 237 (FIG. 26) that receives a latch member 239 (FIGS. 3, 4 and 27) when the handle structure 201 is in the "on" position. Thus, if an attempt is made to pivot the cover structure 19 to the open position when the handle structure is in the "on" position, the latch member 239 that is fixedly secured to one of the side walls of the housing structure, will engage a shoulder portion 241 (FIG. 26) on the connecting part 225 to prevent opening movement of the cover structure 19. When the handle structure 201 is operated to the "off" position, the connecting part 225 moves away from the latch member 239 clearing the shoulder 241 thereby permitting an opening operation of the cover structure 19.

A locking member 243 (FIG. 26) is pivotally supported intermediate the ends thereof on the handle part 209 by means of a pivot pin 245. A spring member 247 is provided to bias the locking member 243 to an unlocking position disposed generally within a cavity in the handle part 209. The locking member 243 is shown in the unlocking position in FIGS. 3 and 4. When it is desired to padlock the handle structure 201 in either the "on" position or "off" position, the member 243 is pivoted to the locking position seen in FIG. 26 during which movement a locking toe or projection 251 passes through one of two slots 253 or 255 (FIG. 25) in the cover part 215 and through a slot 257 (FIG. 27) in the inner part 205 of the handle structure 201 thereby preventing rotation of the handle structure 201 thereby preventing operation of the enclosed switch structure. This movement of the member 243 to the locking position shown in FIG. 26 exposes an elongated opening 259 that can receive as many as three hasps of three separate padlocks thereby providing that the handle structure 201 can be padlocked in either position with from 1 to 3 different padlocks.

As was hereinbefore described, when the handle structure 201 is in the "on" position, the latch part 239 (FIG. 27) on the receptacle part of the enclosure is disposed within the opening 237 (FIG. 26) of the connecting part 225 so that the ledge 241 of the connecting part 225 will engage the latch member 239 to prevent an opening operation of the cover structure 19. When the handle structure 201 is rotated to the full "off" position, the ledge or shoulder 241 (FIGS. 26 and 27) clears the latch member 239 on the receptacle part of the enclosure permitting an opening operation of the cover structure 19. In order to provide that padlocking of the locking member 243 will prevent an opening operation of the cover structure 19 when the handle structure 201 is in the "off" position, the camming slot 253 is curved in the manner seen in FIG. 25 such that the handle structure 201 must be in the full "off" position in order to align the opening slot 253 with the locking projection 251 (FIG. 26) thereby providing that at the start of the padlocking operation the handle structure 201 will be in the full "off" position. As the padlocking member 243 is rotated to the padlocking position seen in FIG. 26, the locking projection 251 engages the side walls of the camming slot 253 camming the handle structure 201 back toward the "on" position a distance sufficient to reengage the shoulder 241 of the connecting part 225 under the latch member 239. This movement to the cover latching position seen in FIGS. 25 and 27 is insufficient to actuate the enclosed switch structure to the "on" position. The slot 255 (FIG. 25) need not be a camming slot to effect a padlocking operation when the handle structure 201 is in the "on" position since there is no question that when the handle structure 201 is in the "on" position the shoulder 241 on the connecting part 225 is disposed under the latch member 239 latching the cover in the closed position. The slot 255, however, is formed as a camming slot because the same handle cover structure 19 (FIG. 3) can be used to cover and operate the switch structure 29 on the left or the switch structure 29 on the right. Thus, when the position of the cover structure is reversed, the slot 255 becomes the "off" slot and, as was previously described, the slot should be a camming slot when the handle structure is to be padlocked in the "off" position in order to move the connecting part 225 into latching engagement with the latch member 239 to prevent an opening operation of the cover structure when the handle structure is padlocked in the "off" position.

Thus, it can be understood that there is provided an enclosed switch structure wherein the cover structure is automatically latched when the handle structure and switch are in the "on" position which cover structure is automatically operated to an unlatched position when the handle structure and switch are operated to the "off" position, and which cover structure is provided with means for padlocking the handle structure in either the "on" or "off" positions thereby locking the cover in the closed position and the switch in either the "on" or "off" position when the handle structure is padlocked in either the "on" or "off" positions.

When the handle structure 201 is in the "on" position and when the handle structure is not padlocked in the "on" position, the latch 241, 239 can be defeated in order to permit an opening operation of the cover structure 19. As can be seen in FIG. 26, a slot 261 is provided in the cover part 215, and an indentation 263 is provided in the top of the inner handle structure part 205. When it is desired to open the cover with the switch in the "on" position, a screwdriver or other tool is inserted through the slot 261 (FIG. 26) and into the indentation 263, and the internal part 205 of the handle structure 201 is forced rectilinearly to the right (FIG. 26) against the bias of the spring 221 to an unlatching position wherein the shoulder 241 of the part 225 is clear of the latch member 239 on the receptacle part of the enclosure thereby releasing the cover structure 19 so that it can be pivoted to the open position.

As seen in FIG. 26, when the locking member 243 is moved to the padlocking position seen in FIGS. 25–27, the locking projection 251 engages an end part 267 on the internal part 205 of the handle structure 201 to prevent movement to the right (FIGS. 26 and 27) to thereby prevent a defeating operation of the latch 241, 239 by operating a tool through the opening 261 (FIG. 26). If it is desired to not provide the means preventing a defeating operation of the cover structure when the handle structure is padlocked in either the "on" or "off" positions, the part 267 can be removed from the inner part 205 leaving an open ended slot 257.

Means are provided to latch the cover structure 19 in the closed position and to permit padlocking of the cover structure 19 in the closed position without latching or locking the handle structure 201. Thus, the fused switch structure 29 can be operated with the cover structure 19 padlocked in the closed position.

Figure 28:
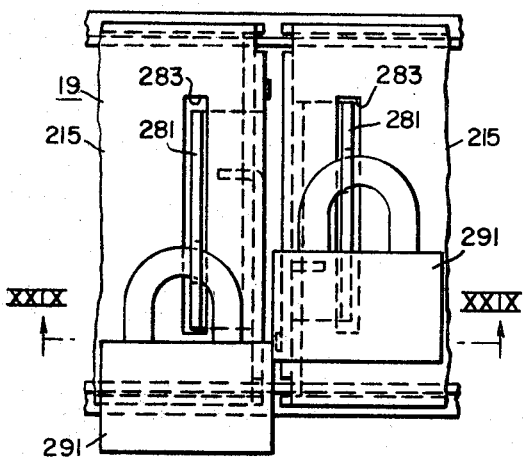
FIG. 28 is a top plan view of part of one of the enclosed switch structures illustrating the positions of two padlocks padlocking two covers in the closed position.
Figure 31:
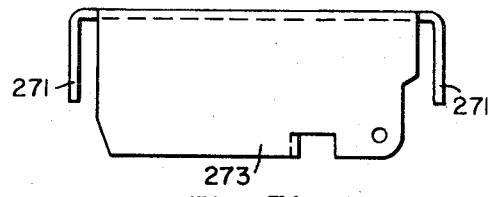
FIG. 31 is an end view of one of the cover structures seen in FIG. 28.
Figure 32:
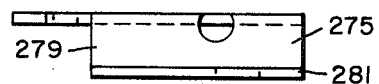
FIG. 32 is a top plan view of the latch seen in FIG. 30.
Figure 29:
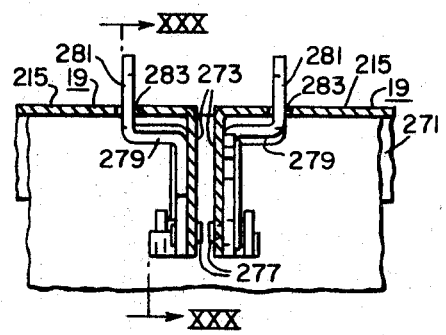
FIG. 29 is a sectional view taken generally along the line XXIX—XXIX of FIG. 28 with the padlocks removed.
Figure 30:
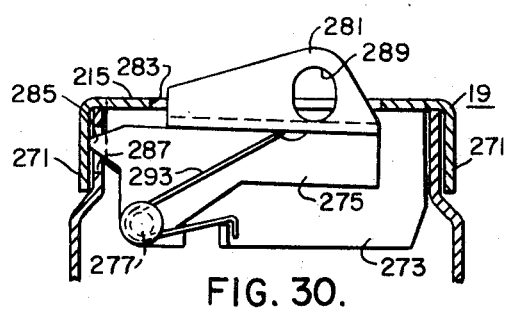
FIG. 30 is a sectional view taken generally along the line XXX—XXX of FIG. 29.

Referring to FIGS. 28–32, it will be seen that the cover structure 19 comprises a top part 215, two side flanges 271 and an end flange 273. A latch 275 is pivotally supported one the end flange 273 by means of a pivot pin 277. The latch 275 is bent-over at 279 (FIG. 29.) and a part 281 thereof extends out through an opening 283 in the cover part 215 when the latch 275 is in the latching position. A latching part 285 (FIG. 30) protrudes through an opening 287 in one of the side walls of the receptacle enclosure to latch the cover structure in the closed position, seen in FIG. 30. The part 281 is provided with an opening 289 therein to receive the hasp of a padlock 291 (FIG. 28)

to permit an operator to padlock the cover structure 19 in the closed position. A torsion spring 293 (FIG. 30) biases the latch 275 to the latching position seen in FIG. 30. In order to open the cover structure, a worker must press the latch part 281 downward pivoting the latch 275 in a clockwise (FIG. 30) direction about the pin 277 and against the bias of the spring 293 to move the part 285 out of the opening 287 to an unlatching position. With the latch 275 in an unlatching position, the cover structure can then be pivoted to the open position seen on the right in FIG. 3. When the cover structure is pivoted to the closed position, the part 285 of the latch 275 engages the end of the receptacle side wall and the latch 275 is automatically pivoted in a clockwise (FIG. 30) direction permitting the cover structure to be moved to the fully closed position. Near the end of this closing movement, the spring 293 will pivot the latch 275 into the latching position seen in FIG. 30 to automatically latch the cover structure 19 in the closed position. With the latch 275 mounted on the cover structure 19 to engage the receptacle side wall at an opening in the side wall in order to latch the cover closed there is no need for latch-supporting graces extending between the side walls, which braces could interfere with a worker during wiring operations. With the latch 275 mounted on the cover structure 19 rather than on the receptacle part of the enclosure, the opening 283 at the front of the cover structure 19 can be kept relatively small to provide increased protection against the ingress of dirt or foreign bodies into the enclosure from the front of the closed switch structure.

An insulating barrier 296 (FIGS. 3 and 4) is removably supported between the fused switch structures 29 in order to catch objects such, for example, as a screw driver that might be dropped between the fused switch structures 29.

A higher-rated enclosed switch structure is disclosed in FIGS. 35–38. Those parts of the enclosed switch structure disclosed in FIGS. 35–38 that are similar to the parts of the hereinbefore described enclosed switch structure 3 are identified in FIGS. 35–38 by means of reference characters that are identical to the reference characters of the hereinbefore described embodiment except that the reference characters of the similar parts in FIGS. 35–38 are primed. Referring to FIG. 35, the enclosed switch structure 3' comprises two cover structures 19' (only one of which is shown) disposed in an end-to-end relationship to cover two fuse switch structures 29' that extend transversely between the side walls of the enclosure. The higher-rated fuses 85' are mounted at the side of the switch structure (FIG. 35) and the space occupied by the fuses in the first embodiment 85 (FIGS. 4 and 20) is occupied in the second embodiment (FIG. 35) by a larger and higher-rated arc-extinguishing structure 301. The arc-extinguishing structure 301, like the previously described arc-extinguishing structure 87, is a closed-back structure, distinguishing from prior-art open-back structures wherein the arc-extinguishing structures were constructed with through-venting, to provide a blow-back effect to move the gases and arc back toward the front opening during circuit interruption. Each of the arc-extinguishing structures 301 comprises a molded insulating housing 303 comprising three integral housing parts 305 for the three pole units of the switch. Each of the insulating housing parts 305 comprises a top or back and four side walls extending downward from the back forming a pocket or cavity that is closed at the back and four sides and open at the lower or front end thereof. A plurality of flat planar magnetic steel plates 307 are mounted in a spaced parallel mutually flatwise face-to-face relationship in suitable slots in the cavity. Each of the plates 307 is formed with a slot 309 (FIG. 36) therein, which slot comprises a first part 311 that leads into a second part 313. The slots 309 are aligned whereby the parts 311 thereof receive the movable contact arm 49' and permit movement of the movable contact arm 49' between open and closed positions. The parts 313 of the aligned slots 309 receive the moving arcs that are generating during opening operations of the switch. As can be seen in FIG. 36, the slots 309 are constructed such that the parts 313 thereof extend off at an angle relative to a plane that would be generated, during opening operations, by a line extending in the direction of elongation of the elongated movable contact arm 49'. During an opening operation of the switch, the arc is magnetically drawn in the slot 309 back into the cavity in the direction of the slot part 313 toward the left-hand back corner (FIG. 36). The arc moves in this direction until a buildup of pressure forces the arc gases and arc back toward the open end of the cavity reversing the direction of the arc whereupon the arc is then blown toward the open end of the cavity. The arc is extinguished before it reaches the ends of the arc plates 307. The path of the arc during circuit interruption is shown by the series of small arrows in FIG. 36. By means of the reversal of direction, the effective length of the arc plates 307 is increased. The insulating barriers 317, as disclosed in FIG. 36, cooperate with barrier means 41 (FIGS. 16 and 20) of the member 89 to separate the three pole units so that the gases of the pole units are isolated thereby minimizing the possibility of phase-to-phase flashover during circuit interrupting. In each pole unit an insulating barrier (part of which is shown in dot-and-dash lines in the left-hand pole unit as seen in FIG. 36) that is molded integral with the insulating member 89 is provided as a barrier in the lower part of the associated chamber to provide a passageway to guide the arc-gases away from the contacts during operation of the switch.

While the invention has been disclosed in accordance with the provisions of the patent statutes, it is to be understood that various changes in the structural details and arrangement of parts thereof may be made without departing from some of the essential features of the invention. It is desired, therefore, that the language of the appended claims be given as reasonably broad an interpretation as is permitted by the prior art.

I claim as my invention:

1. A switch device comprising an enclosure having an enclosure opening at the front thereof, a cover movable to open and close said enclosure opening, said cover comprising a generally planar front, a switch mechanism disposed within said enclosure and comprising a stationary contact and a movable contact, a generally U-shaped operating member supported for pivotal movement about a first axis and supported with the opposite legs thereof extending generally toward said front, lever means comprising a plurality of lever members, each of said lever members being movable along a plane generally parallel to the plane of said cover front, said lever means being disposed below the bight portion of said U-shaped operating member, a contact support disposed above the bight portion of said U-shaped operating member and being pivotal about a second axis generally parallel to said first axis to operate said movable contact into and out of engagement with said stationary contact, an operating handle externally mounted on said cover, means operatively connecting said external operating handle with at least one leg of said generally U-shaped operating member, and said external operating handle being operable to pivot said U-shaped operating member to thereby operate said movable contact into and out of engagement with said stationary contact.

2. A switch device according to claim 1, said external operating handle being supported on said cover for movement about an axis normal to the generally planar front of said cover.

3. A switch device according to claim 1, an over-center spring disposed below the bight portion of said U-shaped operating member and operatively connecting said U-shaped operating member with said lever means, an elongated movable contact arm supported on said contact support extending generally toward said front and carrying said movable contact in proximity to the front end thereof, said operating handle being operable to pivot said U-shaped operating member between two operating positions to thereby operate said overcenter spring and lever means to thereby move said movable contact arm between an open position wherein said movable contact is disengaged from said stationary contact and a closed position wherein said movable contact is engaged with said stationary contact.

4. A switch device comprising an enclosure having an opening at the front thereof, a cover movable to open and close said opening, said cover comprising a generally planar front, a switch mechanism disposed within said enclosure comprising a plurality of stationary contacts, a separate movable contact for each of said stationary contacts, a tie bar supported for pivotal movement about a first axis, said first axis being parallel to the plane of said cover front, a separate elongated contact arm for each of said movable contacts, means supporting each of said movable contact arms on said tie bar with each movable contact arm extending generally toward the front of said enclosure and carrying the associated movable contact in proximity to the front end thereof, a generally U-shaped operating member comprising a bight portion and a pair of opposite leg portions, means supporting said generally U-shaped operating member for pivotal movement about a second axis that extends between said leg parts generally parallel to said bight portion which second axis is disposed between said bight portion and the ends of said opposite legs and which second axis is generally parallel to said first axis, lever means supported in back of said tie bar, said lever means comprising a plurality of lever members each of which is supported for movement along a plane generally parallel to the plane of said cover front, said generally U-shaped operating member being supported with the bight portion thereof being disposed between said tie bar and said lever means, means operatively connecting said lever means with said tie bar, an overcenter spring supported in back of said tie bar and operable upon operation of said operating member to operate said lever means, said overcenter spring being movable along a plane generally parallel to the plane of said cover front, said generally U-shaped operating member being pivotable movable between two operating positions to operate said overcenter spring and to engage and move said lever means to thereby move said tie bar to operate said movable contacts into and out of engagement with said stationary contacts, and external operating means operable when said cover is closed to operate said generally U-shaped operating member between said two operating positions.

5. A switch device according to claim 4, said external operating means comprising an external operating handle supported on said cover for movement about an axis generally normal to the plane of said cover front, and with said cover in the closed position connecting means operatively connecting said external operating handle with at least one leg of said generally U-shaped operating member.

References Cited

UNITED STATES PATENTS 2,988,612    6/1961    Hercules.
3,134,877    5/1964    Ericson.
3,141,934    7/1964    Beaudoin et al.

ROBERT S. MACON, Primary Examiner

U.S. Cl. X.R.

200—50, 144